Patented Nov. 17, 1942

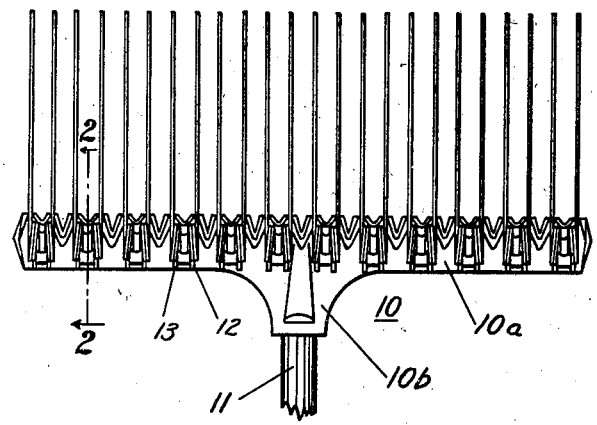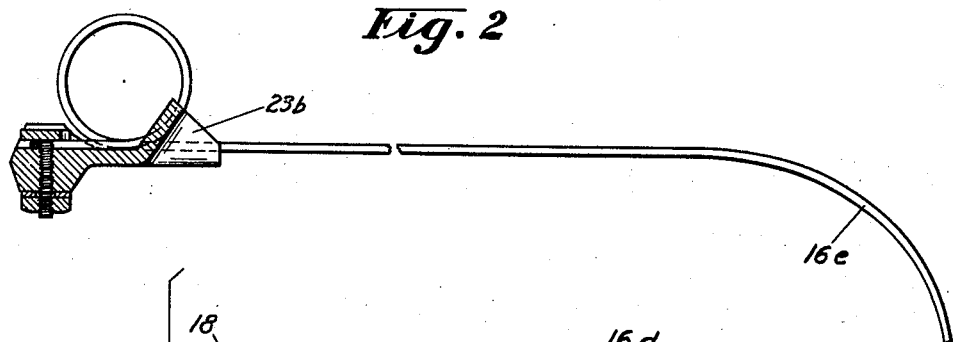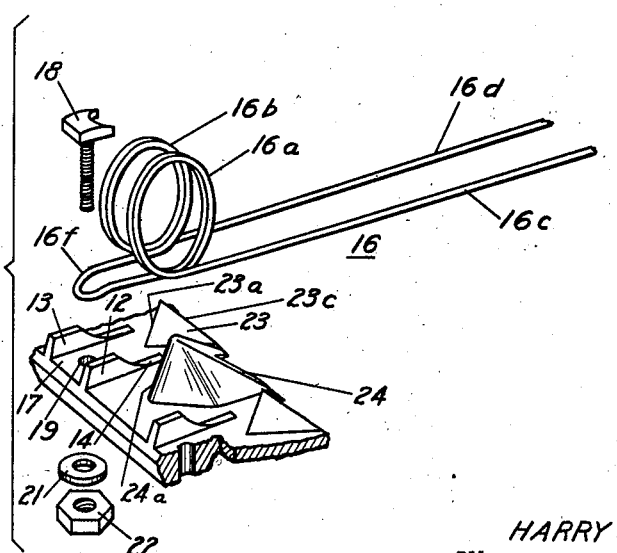

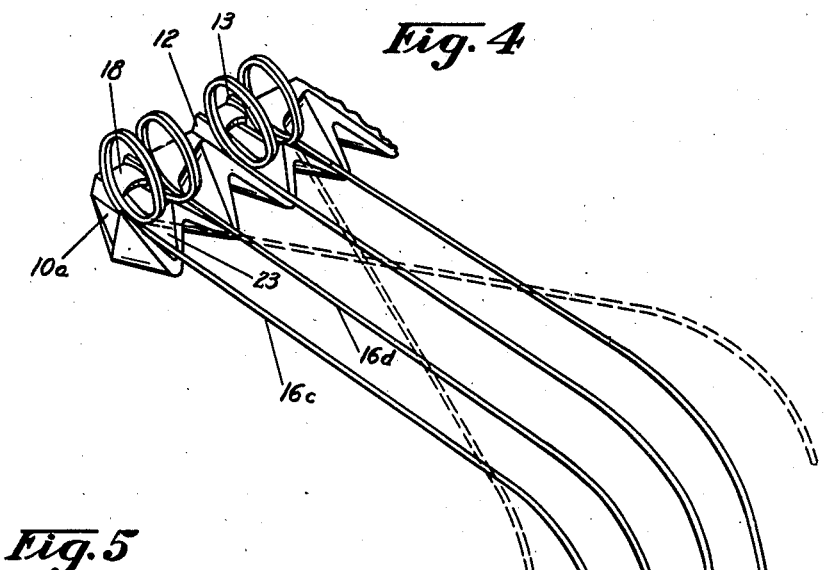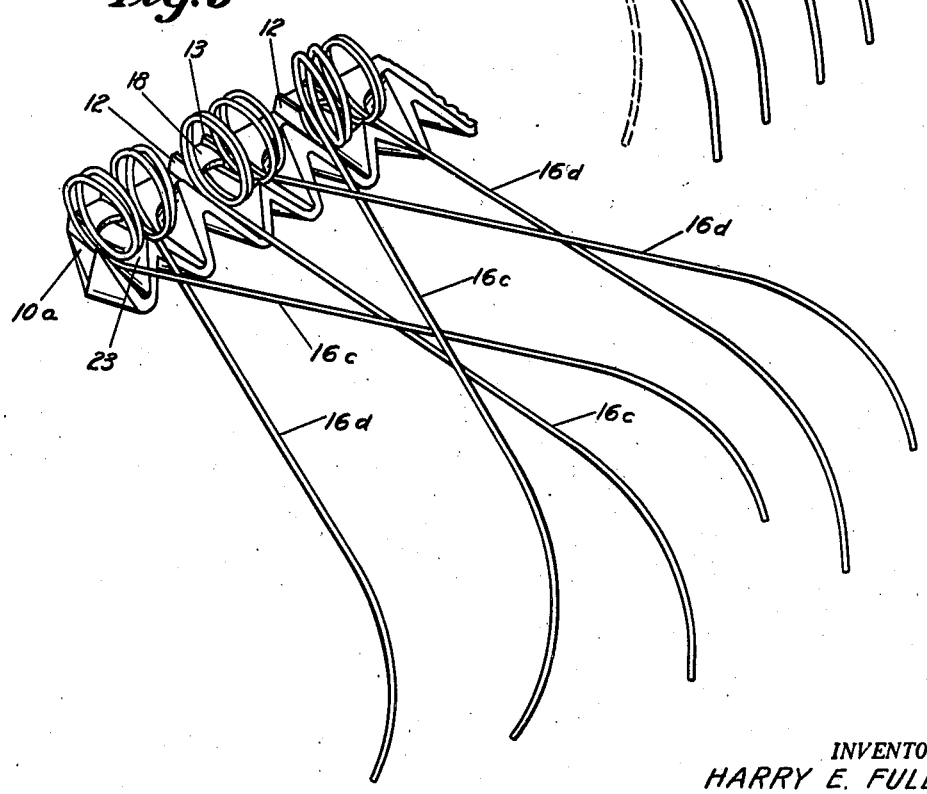

2,302,541

UNITED STATES PATENT OFFICE 2,302,541

LAWN BROOM

Harry E. Fuller, Newhall, Iowa

Application July 24, 1939, Serial No. 286,224

5 Claims. (Cl. 56—400.17)

This invention relates to lawn brooms and has particular relation to a broom type rake which employs spring wire for the rake teeth and a bar to which the teeth are engaged.

Rakes of the character here considered must meet several requirements in order to secure maximum raking efficiency under all conditions. For instance, it may be necessary to use the rake in the corner of a garden wall, or it may be desirable that the rake may be used in removing material from about stones and the like. The rake may be used in removing sticks, leaves, grass and the like from graveled surfaces.

Such operations should be accomplished without permanent distortion or displacement of the teeth of the rake and without any permanent injury to the rake. It is, therefore, among the general objects of my invention to provide, in a lawn broom, means for permitting distortion of the teeth, as for instance in passing over a stone or the like, by compelling a return of the teeth to their normal raking position.

Another object of my invention is to provide means for joining the teeth to their supporting bar such that the natural resilience of the teeth will return them to their normal position when the obstacle has been passed.

Another object of my invention is to materially decrease the cost of manufacture of a lawn broom of the above character.

Still another object of my invention is to provide a spring tooth structure so constructed and arranged that the teeth will not lock upon themselves as the teeth swing from side to side, nor lock upon themselves while in use.

Still another object of my invention is to provide a rake having teeth which may be bent almost at right angles to their normal position without permanent distortion or locking of the teeth.

Still another object of my invention is to provide a lawn broom type rake in which the teeth are held by their own resilience in fixed, properly spaced relation.

Still another object of my invention is to materially simplify the structure of a lawn broom of the above character so that the broom may be cheaply and inexpensively constructed.

Other and further features and objects of the invention will be more apparent to those skilled in the art upon a consideration of the accompanying drawings and following specification, wherein is disclosed a single exemplary embodiment of the invention, with the understanding, however, that such changes may be made therein as fall within the scope of the appended claims, without departing from the spirit of the invention.

In said drawings:

Figure 1 is a plan view of a rake constructed according to a preferred embodiment of my invention. Only a portion of the handle of the rake is shown.

Figure 2 is a view, partly in section and partly in elevation, taken along the line 2—2 of Figure 1.

Figure 3 is a view in exploded relation of a fragment of the bar of the main frame of the rake, a pair of teeth, and the means for securing the teeth to the bar.

Figure 4 is a view in perspective illustrating how the pairs of teeth or "twin" teeth are secured to the bar and how the teeth may be sprung without interlocking or permanent distortion, and Figure 5 is a view in perspective illustrating how the teeth may be sprung so that the teeth of one pair overlap, or adjacent teeth on adjacent pairs may overlap, and how these will be returned by their own resilience to the normal position.

Referring now to the drawings:

A lawn broom constructed according to a preferred embodiment of my invention has a main frame or spacer bar, illustrated generally at 10, and comprised of a bar 10a and handle socket 10b. The handle socket 10b is tapered in accordance with the usual practice to receive a wooden handle 11.

The upper face of the bar 10a is provided with a plurality of upwardly projecting flanges 12 and 13 (Figure 3) toward the rear or socket side of the bar. These flanges 12 and 13 are in pairs and the spacing between the adjacent pairs is slightly greater than the spacing between the flanges which constitute a pair. These flanges are preferably rounded, as illustrated at 14, to permit ready movement of the coils 16a and 16b of the U-shaped tooth members indicated generally at 16.

The teeth, as illustrated in the drawings, are preferably constructed of spring wire and are formed in U-shaped arrangement to provide two teeth or a "twin" tooth from a single wire. Each of the legs 16c and 16d of the double tooth 16 is curved at the outer or free end, as indicated at 16e. The inner end of each pair of teeth is looped, as shown at 16f. In order to afford greater resilience in the horizontal plane, the teeth are preferably provided with double coils such as illustrated at 16a and 16b. The loop 16f of each of the double teeth 16 is placed in the space 17 between flanges 12 and 13 and each loop locked in place by the bolt 18 which passes through the loop and through an opening 19 in the bar. The bolts are held in place by means of the washers 21 and nuts 22. As stated before, the spring teeth are built up of a plurality of double teeth, as illustrated in Figure 1, and the double teeth are so spaced with relation to each other that a number of equally spaced teeth are provided along the length of the bar 10a.

It is apparent that the coils of the spring teeth and the natural resiliency of the teeth themselves will permit bending of the teeth or displacement of the teeth to a considerable extent without permanent distortion. The teeth of the device here shown may be bent almost at right angles, if, for instance, the broom is passed over a rock or the like. They will then spring back to their normal position, provided of course that interlocking of the teeth between themselves or locking or catching of the teeth on the bar does not occur.

I have provided means for utilizing the resilience of the teeth to assist in directing them back to their normal position, and furthermore have provided guide means which prevent interlocking of the teeth or locking on the bar as well as assist in guiding the teeth back into normal position after deflection thereof. These means, in a preferred embodiment of the invention, are comprised of two-sided, triangular, upstruck portions of the space bar, such as indicated at 23 and 24 in the drawings. These upstruck portions are preferably in the form of a pair of triangular members joined at the rear edge 23a and open toward the front as indicated at 23b in Figure 2.

The front edges of the triangular portions indicated at 23c form sloping guides to direct the teeth back to their normal position, and if a tooth is deflected, it rides up on one edge of the upstruck portion, as for instance the edge 23c. When the obstruction which has caused deflection of the tooth has passed, the resiliency of the coil of the tooth and the resilience of the tooth itself will cause it to slide downwardly along the edge 23c which will direct the tooth back to its normal position parallel with the other teeth of the broom.

It should be noted from Figure 3 that the coils 16a and 16b are coiled or wound outwardly away from the looped rear end 16f of the double tooth. The teeth proper, that is the parts 16c and 16d, are prevented from being forced together where they adjoin the coiled portions 16a and 16b by the coils themselves. The tooth portion 16c will, to a large extent, ride up and down along the adjoining loop of the coil 16a as well as along the edges of the triangular guide members 23 when that tooth portion is deflected toward its twin tooth 16d. Therefore, the coils of each twin tooth member will prevent the tooth portion thereof from rising sufficiently high, under normal usage, to become locked behind the point of the division or guide member 23. Tooth members in various stages of distortion are shown in Figures 4 and 5.

The upstruck portions 24, separating the adjacent pairs of teeth, are substantially the same as the upstruck portions 23 except that they are larger and the edge 24a is preferably rounded instead of being sharp such as the edge 23a. The reason that the upstruck projections or divisions 24 are larger than the projections or divisions 23 is that when one of the tooth portions 16c of a twin tooth is deflected away from rather than toward its twin tooth 16d, tending to spread the turns of the coils, its freedom of movement is not impeded by the adjacent coil 16a, and the larger division members 24 permit a maximum freedom of movement and still eliminate the possibility of a tooth becoming locked behind the point of the division member.

In manufacturing a lawn broom constructed according to my invention, the bar 10 may be made of a single casting to which the double teeth are bolted. Locking of the teeth with each other or with the bar is prevented by the triangular upstruck divisions. The double coils of the teeth permit deflecting of the teeth, even to a full right angle turn, without permanent distortion.

It will be noted in Figure 3 of the drawings of the "twin" teeth that the U portion of the tooth, through which the fastening bolt is passed, is bent upwardly or humped a short distance from the end. This is done so as to bind the teeth in place under compression of the spring-like member thus formed. This construction tends to eliminate loosening of the bolts.

A device constructed according to my invention may be manufactured a a lower cost than the devices of the prior art and yet greater flexibility is afforded.

Although I have described a specific embodiment of my invention, it is apparent that modifications thereof may be made by those skilled in the art. Such modifications may be made without departing from the spirit and scope of my invention as set forth in the appended claims.

I claim as my invention:

1. In a lawn broom, a spacer bar, a plurality of tooth members, bolt means fixedly mounting the said tooth members in spaced relation on the rear edge portion of the spacer bar, spring means resiliently biasing each tooth member toward its normal position substantially parallel with the other tooth members, and spacing and guiding means of substantially pyramidal form extending outwardly from the spacer bar at the forward edge portion thereof and between adjacent tooth members.

2. In a lawn broom, a spacer bar, a plurality of tooth members, bolt means for attaching the tooth members in spaced relation on the rear edge portion of the spacer bar, upstruck spacing and guiding members of substantially pyramidal shape disposed on the forward edge portion of the spacer bar and between the tooth members, the slanting sides thereof adapted to guide the tooth members back to their normal positions after any deflection therefrom, and means comprising a loop in each tooth member for providing great resilience and flexibility to each tooth member, said loop being disposed between the mounting means and the spacing and guiding means.

3. In a lawn broom, a spacer bar, a plurality of upstanding pyramidal guide portions of substantially triangular cross section formed integral with the forward edge portion of the spacer bar, and a plurality of resilient tooth members disposed between the pyramidal guide portions and fixedly attached to the spacer bar along the rear edge portion thereof, the tooth members being provided with coiled portions between the guide portions of the bar and the points of attachment of the respective tooth members to the spacer bar.

4. In a lawn broom, a spacer bar, teeth secured to the spacer bar along the rear edge thereof, a plurality of upstruck members disposed along the forward edge of the spacer bar, the edges of the upstruck members being sloped to the bases thereof, to guide the teeth to their normal position, the teeth having resilient portions adapted to bias the teeth toward their normal positions, and spacing flanges on the bar engaging the sides of the teeth along the rear edge portion of the bar to support the teeth in spaced position.

5. In a lawn broom, a cross bar, a plurality of U-shaped tooth members, a plurality of tooth positioning lugs projecting transversely from the cross bar on the rear edge portion thereof, bolts securing the tooth members, at the return-bend portion thereof, between pairs of the said adjacent positioning lugs with the tooth members extending over the forward edge of the bar, pyramidal guide members of substantially triangular cross section disposed between adjacent tooth members and extending outwardly from the forward edge of the bar, the said tooth members being looped on each side of the return bend thereof and between the rear and forward edges of the bar, whereby great resiliency is provided each tooth by the loops but whereby a limited amount of permanent distortion of the loop of a tooth will not prevent return by the guide members of the tooth to its normal position.

HARRY E. FULLER.